Nov. 14, 1933.   S. B. GRISCOM ET AL   1,935,292
REGULATOR SYSTEM
Original Filed April 16, 1928   4 Sheets-Sheet 1

INVENTORS.
Samuel B. Griscom &
Charles F. Wagner.
BY
ATTORNEY

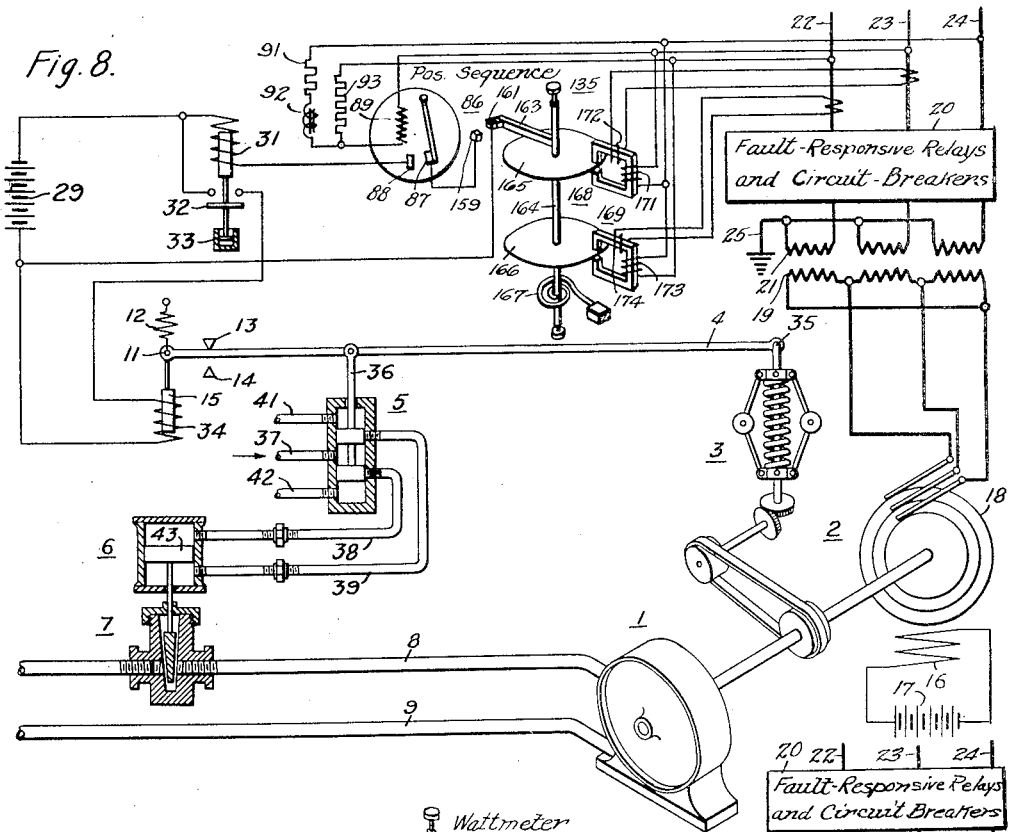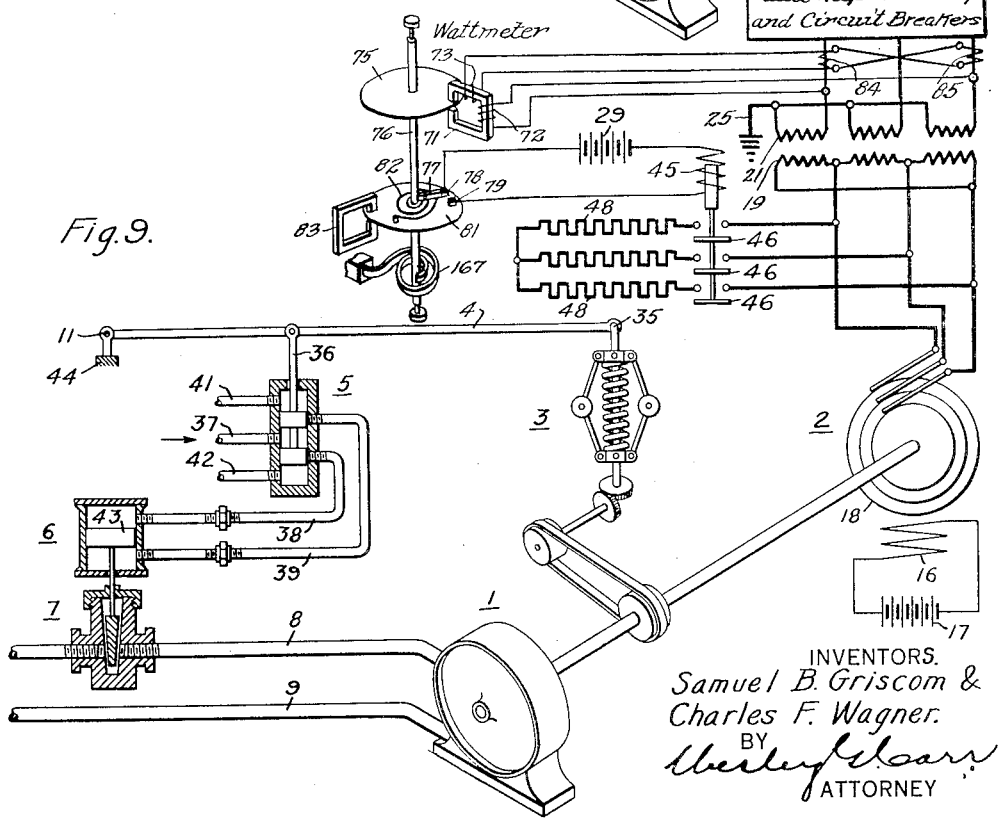

Nov. 14, 1933.  S. B. GRISCOM ET AL  1,935,292

REGULATOR SYSTEM

Original Filed April 16, 1928  4 Sheets—Sheet 3

INVENTORS.
Samuel B. Griscom &
Charles F. Wagner.
BY
ATTORNEY

Nov. 14, 1933.    S. B. GRISCOM ET AL    1,935,292
REGULATOR SYSTEM
Original Filed April 16, 1928    4 Sheets-Sheet 4

INVENTORS.
Samuel B. Griscom &
Charles F. Wagner.
BY
Wesley G. Carr
ATTORNEY

Patented Nov. 14, 1933

1,935,292

UNITED STATES PATENT OFFICE 1,935,292

REGULATOR SYSTEM

Samuel B. Griscom, Pittsburgh, and Charles F. Wagner, Swissvale, Pa., assignors to Westinghouse Electric and Manufacturing Company, a corporation of Pennsylvania Application April 16, 1928, Serial No. 270,187
Renewed September 23, 1931

42 Claims. (Cl. 290—40)

Our invention relates to means for improving the stability of electric power transmission systems during such conditions as give rise to "generator overswing", tending to cause the generator and motor ends of the transmission line to fall out of synchronism.

When the power demand on a generator station increases or decreased, suddenly, because of load changes that are caused by switching operations, short circuits on the transmission line, or other transient phenomena, there exists a temporary unbalance between the power input and the power output of the generating unit. This is caused by the fact that electrical changes in the system occur much more quickly than mechanical changes, on account of the relatively great inertia of mechanical parts. A governor controlling the speed of a generator prime mover permits a certain predetermined input to the prime mover for a given governor speed, and is unable to change this input as rapidly as the output from the generator is changed since the governor action is dependent upon a change in speed of the generator.

The difference in the power input and the power output of the generator set, occasioned by sudden changes of load upon the generator, causes the generating unit to absorb power from, or deliver power to, the transmission line, thereby changing the stored kinetic energy of rotation of the generating unit and causing it to slow down, or speed up, as the case may be.

Upon a change in speed of the generator, causing the generator rotor to assume a different phase position with respect to the motor apparatus connected to the transmission system, the power required to be furnished by the generator will be such as to diminish the unbalance between the power input and the power output of the generating unit, thus tending to bring the system into equilibrium. When the angle between the phase position of the generator rotor and the transmission system becomes such that the condition of power balance is reached, the generator rotor has a velocity either in excess of, or less than, that of the motors connected to the transmission system, and, therefore, must travel beyond the point of equilibrium. The generator rotor will travel, first in one direction, and then in the opposite direction, from the point of equilibrium, for a while before an unchanging phase angle results. This phenomenon is termed "generator overswing" and its effect is to lessen the degree of stability of a power-transmission system because the upper limit of the capacity of the transmission line must be sufficient to permit the supply of sufficient power to absorb the momentum of the generating equipment during its maximum swings in order to prevent the generators from falling out of synchronism with the transmission lines.

An object of this invention is to increase the stability of a transmission line by electrically initiating a corrective action upon the occurrence of conditions that produce "generator overswing".

Three methods are suggested for providing a cushioning effect to reduce or eliminate the effect of "generator overswing". This may be done (a) by lowering the power input to the prime mover by modifying the action of the governor, (b) by lowering the power input to the prime mover by causing a change in the pressure head of the motive fluid supplied to the prime mover, or (c) by electrically dissipating the energy stored in the revolving masses of the generating unit.

It is desirable that a mechanism for improving the stability of a transmission system during transient power-circuit conditions may be adapted to select those disturbances which are likely to result in instability, vary the input to the prime mover or output from the generator with a minimum time delay and at a rapid rate, and, when the disturbance is over, cause the power supply to the generating unit to gradually return to the proper constant value.

Our invention will be better understood by reference to the accompanying drawings, in which:

Fig. 8 is a diagrammatic view of circuits and apparatus illustrating an embodiment of our invention, wherein the power input to the prime mover is modified by the action of an electro-responsive means operated upon the occurrence of predetermined power-circuit conditions;

Fig. 9 is a diagrammatic view of circuits and apparatus illustrating an embodiment of our invention, wherein the power output from the generator is modified;

For convenience in discussing the phenomena that occur during transient power-circuit conditions, which may cause "generator overswing", the synchronous machinery of the receiving or motor end of the transmission line is grouped in an approximately equivalent single motor having fixed impedance and internal voltage, the impedance of the single motor may be considered as a part of the total transmission-line impedance. A large power-transmission system usually supplies an extensive receiving network in which there are local generating stations having relatively high inertia of the mechanical parts. The equivalent motor of this receiver generator equipment may, therefore, for exposition purposes, be considered as having infinite inertia and as rotating at constant synchronous speed, regardless of any disturbance which may occur on the transmission line.

Figure 1:
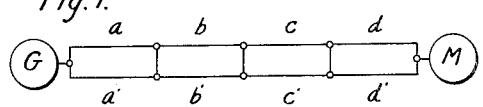
Figure 1 is a diagrammatic representation of a simplified power-transmission system, showing parallel transmission-line circuits connected together at intervals.

Such a simplified power-transmission system is shown in Fig. 1 of the drawings, the letter G representing the generating end and the letter M representing the motor end of the transmission system, and the several sections $a$, $a'$, $b$, $b'$, $c$, $c'$ and $d$, $d'$ representing the sections of two parallel interconnected transmission-line circuits, which may be jointly referred to simply as a multi-circuit transmission line.

Figure 2:
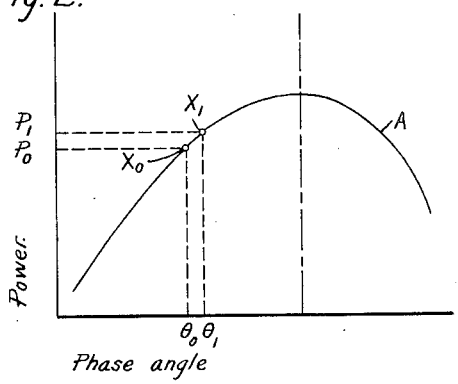
Fig. 2 is a power-angle-curve diagram showing the relation between power input to the generator and the phase angle of the generator rotor with respect to the transmission system.

Fig. 2 shows the general shape of the power-angle curve during normal operation of the system. A point on this curve, such as the point $X_0$, having the coordinates $P_0$, $\theta_0$ represents an equilibrium point of the system. The point $X_0$ is a point of stable equilibrium, as may be determined by a study of the relation represented by the curve.

Assuming that the power input to the prime mover, $P_0$ remains constant and that the generator is shifted, by some means, through an angle from $\theta_0$ to $\theta_1$ with respect to the motor, then the power output of the generator will be $P_1$ which is greater than the power input $P_0$; hence, the generator will be caused to slow down and approach the angle $\theta_0$.

Similarly, if the displacement of the generator is made less by decreasing the angle $\theta_0$, the generator output will be less than $P_0$, and the generator will be caused to increase its speed, again approaching the position corresponding to $\theta_0$.

Figure 3:
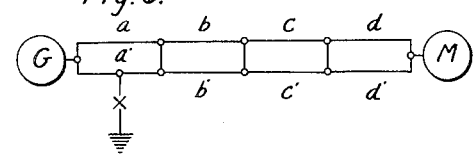
Fig. 3 is a diagrammatic representation of a transmission system similar to Fig. 1, showing the occurrence of a fault upon one section of the system.

For purposes of explanation, let it be assumed that a fault occurs on the transmission line, as represented in Fig. 3. The change in the power-circuit conditions caused by a short circuit from line to ground, as represented in Fig. 3, may cause the power-angle diagram to change suddenly from the conditions represented by the curve A to conditions which may be assumed to be represented by the curve B in Fig. 4. It will be observed that the power output increases from the value $P_0$ to the value $P_2$, while the original angle $\theta_0$ remains the same because of the inertia of the generator. The power input to the prime mover is determined by the gate or valve opening for water or steam-driven units which still corresponds to the value $P_0$. The difference between the power input $P_0$ and the power output $P_2$ must, therefore, be supplied from the kinetic energy of rotation of the generating unit, causing it to slow down. In slowing down, the angle $\theta$ between the generator and motor is decreased, and the power output is also decreased, following the curve B. As a point Y on the curve B is reached, corresponding to the ordinate $P_0$, the power output of the generating unit is again equal to the power input, but the angular velocity of the generator is less than that of the motor. The generator will, therefore, continue to fall behind the motor in phase position, the angle $\theta$ decreasing to a value $\theta_2$, where the velocity of the generator will again be that of the motor. Neglecting certain minor losses in the system, the angle $\theta_2$ will be such that the triangular hatched sections above and below the curve B are equal in area. At the position of the generator rotor corresponding to the angle $\theta_2$, the power output is less than the power input, and the generator will again accelerate. The angle will vary between $\theta_0$ and $\theta_2$, the period of swing depending upon the inertia of the generating unit and the constants of the electrical network of the transmission line.

Figure 5:
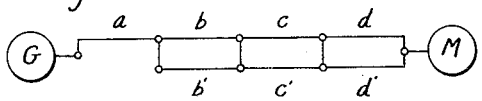
Fig. 5 is a diagrammatic representation of the transmission line representing the faulty section as having been disconnected by the line circuit breakers.
Figure 10:
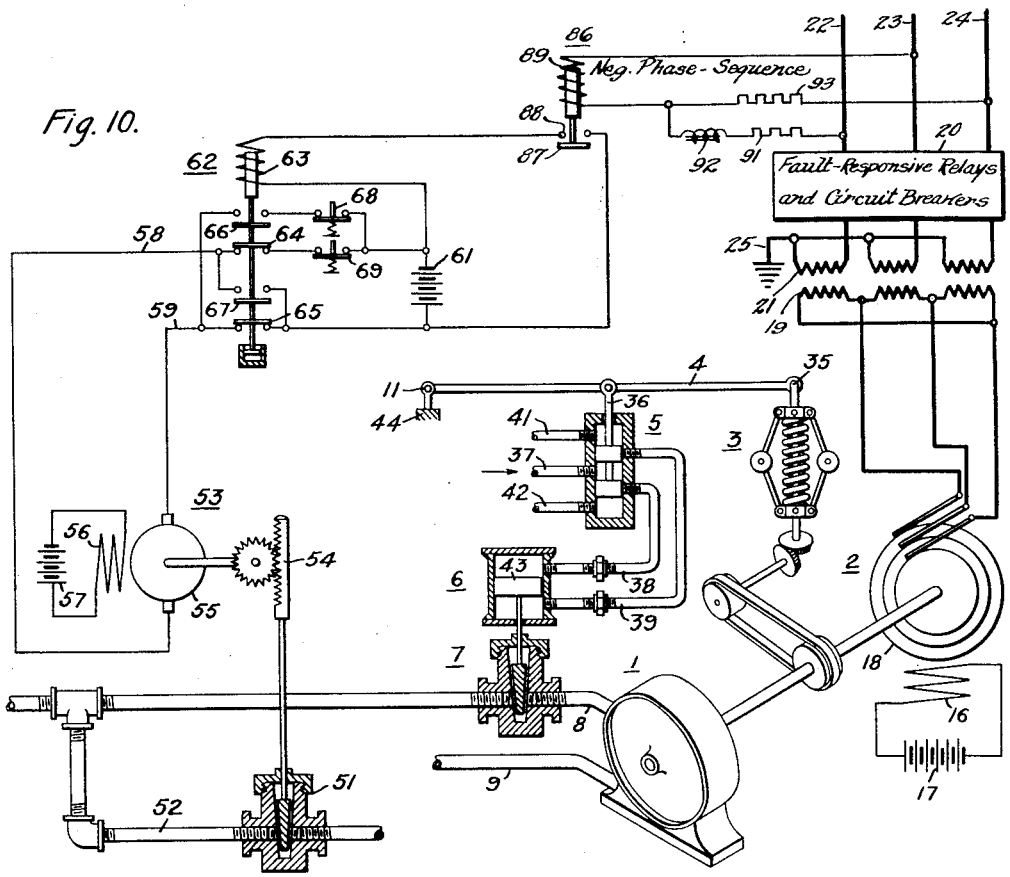
Fig. 10 is a diagrammatic view of circuits and apparatus illustrating an embodiment of our invention, in which the pressure head supplied to the prime mover is modified.

It will be understood that the transmission line is equipped with fault-responsive relays, and circuit breakers controlled thereby, for segregating the various line-sections $a$, $b$, $c$, $d$, $a'$, $b'$, $c'$, and $d'$, as diagrammatically indicated at 20 in Figs. 8, 9, and 10. In Figs. 1 and 5 it may be assumed that the circuit breakers operate to remove the faulty section $a'$ from the transmission system, producing the conditions represented in the diagram of Fig. 5. The circuit breakers may open when the value of $\theta$ is any value between $\theta_0$ and $\theta_2$.

Figure 4:
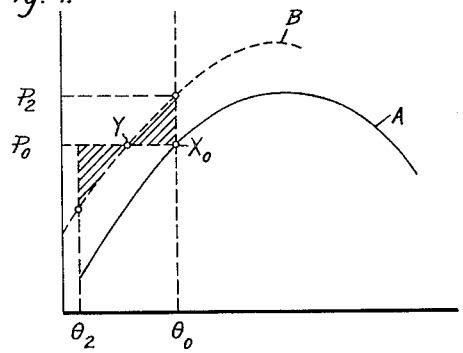
Fig. 4 is a power-angle diagram illustrating the conditions that result from the occurrence of a fault.
Figure 6:
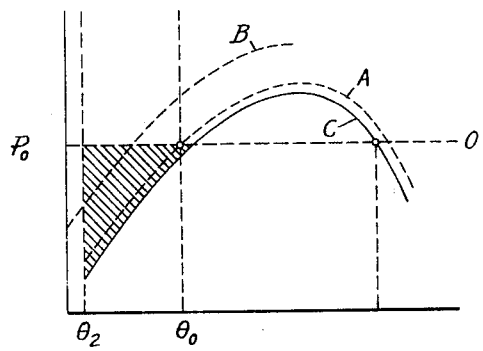
Fig. 6 is a power-angle diagram illustrating the transmission-line conditions occasioned upon the disconnection of the faulty section from the line to produce the circuit shown in Fig. 5.

Fig. 6 represents the power angle diagram, assuming that the circuit breakers opened when the rotor of the generator was at the position corresponding to $\theta_2$. In this diagram, the curve A corresponds to the curve A of Figs. 2 and 4, where all sections of the transmission line were in service. The curve B corresponds to curve B of Fig. 4, representing the conditions during the assumed short circuit. The curve C represents conditions after the faulty section of the transmission line $a'$ has been disconnected from the system.

If the section $a'$ is disconnected from the system when the generator has the position represented by the angle $\theta_2$, the power output of the generator is well below the value $P_0$ of the power input to the prime mover, thus causing the generator to speed up. As in the case of the diagram of Fig. 4, the generator will speed up until the area above the line P₀—O and below the curve C is equal to the cross-hatched area above and to the left of the curve C and below the line P₀—O. It is possible, as is apparent from the diagram, that this condition may not be realized and the angle $\theta$ will then increase without limit, or the generator and motor will pull out of synchronism with each other. Fig. 6 is drawn to represent the condition of a heavily loaded transmission line, wherein the governor equipment can not operate with sufficient rapidity to change the power input to the generators, appreciably, during this transient period. The above diagrams represent power-angle conditions assuming that the power input to the generator is controlled solely by governor mechanism, responsive to changes in speed of the prime mover.

Figure 7:
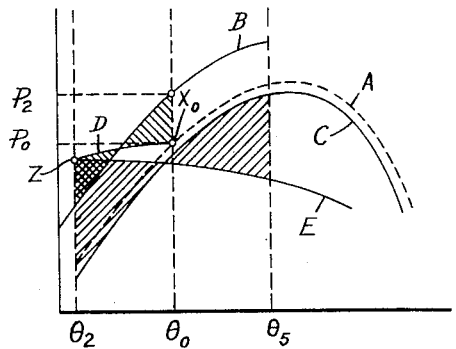
Fig. 7 is a power-angle diagram showing the conditions resulting from a prompt equalization of the power input to, and the power output from, the generating unit, during the transient-power-circuit conditions.

Fig. 7 represents a power-angle diagram, wherein some quantity, other than speed, actuates the governor mechanism or otherwise operates to decrease the input to the generators from the moment that a short circuit occurs. The power input to the generator is essentially a function of time, but, since the angle $\theta$ varies with time, during the transient conditions, the input may be plotted as a function of $\theta$. Referring to Fig. 7, let it be assumed that the generator is operating at the point $X_0$ on curve A, corresponding to the phase angle $\theta_0$ and power input $P_0$, at the moment that the short-circuit condition represented by Fig. 3 occurs, then the power output of the generator immediately rises to the value $P_2$ on the curve B, and the value of $\theta$ then decreases to the value $\theta_2$ along the curve B, as in the case represented in Figs. 4 and 6. During this portion of the swing, the power input to the generator is also reduced, starting substantially instantly after the occurrence of the fault and moving along the line D to the point Z. As the angle $\theta_2$ is reached, the condition represented in Fig. 3 is changed to that represented in Fig. 5, and the generator swings from the value $\theta_2$ to a value $\theta_5$, during which swinging the power input is decreased along the line E. The angle $\theta_5$ is such that the cross-hatched area to the left of the curve C and below the curve E is equal to that to the right of the curve C and above the curve E. It will be apparent from the diagram, that the area between the curves E and C, to the right of their intersection, is much larger than the area below the curve C in Fig. 6 and above the line P₀—O, which means that the stability of the system is largely increased. Fig. 7, therefore, indicates why it is desirable to start to reduce the power input and the net power ouput of the generating unit, at the instant, or very soon after the occurrence of a transient condition upon the transmission line, and before there is any appreciable change in speed of the generator, such as that required to operate the governor mechanism to change the input to the prime mover.

Moreover, even though the reduction in generator-input should not be sufficient to prevent loss of synchronism in a very extreme case, the generator would fall out of step and would consequently be disconnected from the rest of the system, either manually or by the protective relays. There would then be the problem of getting the generator back into service as quickly as possible. Ordinarily this would take some fifteen or twenty minutes, due principally to the racing of the prime-mover when the generator-load was suddenly thrown off. In our system, this racing would be prevented, or very materially reduced, on account of the reduction already effected in the prime-mover input, so that the matter of restoring the generator to service would be greatly expedited, thereby avoiding a serious interruption in service.

In the several figures of the drawings, like parts are indicated by the same numerals.

Referring to Fig. 8 of the drawings, in which one embodiment of our invention is illustrated, a prime mover 1 is illustrated as driving the generator 2, the speed of which is controlled by governor mechanism 3 that actuates a floating lever 4 to operate pilot valve 5 and thereby control an operating cylinder 6 which actuates the gate 7 in the penstock or supply pipe 8, through which the motive fluid is fed to the prime mover. The motive fluid is led from the prime mover through the pipe 9.

The left-hand end of the lever 4 is normally biased to its illustrated or upper position, against the upper one of two stops 13 and 14 by a spring 12 attached to the pivot point 11. The end of the lever 4 corresponding to the pivot point 11 is provided with an electromagnetic core 15, which, when energized, actuates this end of the lever downwardly against the stop 14.

The generator 2 is provided with a field winding 16, that is energized from any suitable source 17, and an armature winding 18 that is connected to the primary windings 19 of a transformer, shown connected in delta relation. The secondary windings 21 of the transformer are shown connected in Y relation to the transmission line conductors 22, 23 and 24, and are provided with a grounded neutral conductor 25.

In Fig. 8, we have shown a transient-responsive means, for safeguarding against generator-overswings, in the form of a relay 86 that is provided with normally disengaged contact members 87 and 88, that may be actuated into engagement upon a predetermined energization of an operating winding 89 that is connected to the conductors 22, 23 and 24 through a phase-sequence network as shown in Fig. 3 of a patent to Allcutt, 1,571,224, February 2, 1926, assigned to the Westinghouse Electric and Manufacturing Company. Such a network will develop a single-phase voltage which is proportional either to the positive-phase-sequence voltage or to the negative-phase-sequence voltage, according to the order of the terminal connections. One side of the relay-winding 89 is connected to one of the transmission-line conductors 22, and the other side of the winding is connected, through a resistor 93, to one of the remaining supply conductors 24, and, through a resistor 91 and a reactor 92, to the other supply conductor 23.

In Fig. 8, the phase-sequence network is connected so as to respond to the positive-sequence voltage, so that, upon the occurrence of a predeterminedly severe fault-condition on the power circuit, the positive-phase-sequence component of the line-voltage will fall from its normal value to at least a predetermined value. Hence the relay-winding 89, receiving a current proportional to the positive-sequence voltage, will operate, at a predetermined current value, to close a circuit through the contact members 87 and 88 for the purpose of initiating a corrective action in the system.

In Fig. 8, the corrective action is effected by the completion of a circuit from the battery 29 through an operating winding 31 of a contactor 32. It may be found desirable to introduce a short time interval in the operation of the relay 86, if it is set to respond to very slight disturbances, in order to prevent the relay from closing when disturbances of very short duration, such as those accompanying switching operations, occur. This causes the relay to distinguish between a switching operation, and an actual fault on the circuit. The contactor 32 may, if desirable for the foregoing or other reasons, be provided with a time-delay element, such as a dash pot 33. In general, however, as explained in connection with Fig. 7, it is preferable to start the corrective action as quickly as possible, in which case the dash-pot 33 will be omitted. Upon the closing of the contactor 32, a circuit is completed from the battery 29 through a winding 34 which energizes the core member 15 previously described.

The energization of the winding 34 will actuate the left-hand end of the lever 4 downwardly against the stop 14, the lever 4 being moved about a pivot point 35. This actuation of the lever 4 operates a piston rod 36 of the pilot valve 5 downwardly, thus permitting fluid to flow through the inlet port 37 and through the pipe 38 to the upper portion of the cylinder 6 and from the lower portion of the cylinder 6 through the pipe 39 and the outlet pipe 41, thus actuating the piston 43 downwardly, or in a direction to close the valve 7. Upon the cessation of the fault-condition on the line 22, 23, 24, the contact members 87 and 88 will open, thus permitting the left-hand end of the lever 4 to be actuated to its upper or illustrated position by the spring 12, thus bringing the pilot valve back to its original position and permitting the further control thereof by the governor mechanism 3.

It is sometimes desirable to introduce a corrective action into the system only upon the flow of a predetermined amount of power at the time when the transient occurs, or immediately prior to the fault which produces the transient. To this end we may utilize a watt relay 135, as shown in Fig. 8, the same being provided with cooperating contact members 159 and 161 which are connected in series with the positive-sequence relay contact members 87, 88, in the energizing-circuit of the contactor winding 31.

The contact member 161 of the watt relay 135 is carried by an arm 163 that is actuated by the shaft 164 upon which are carried two metal discs 165 and 166. The shaft 164 is normally so biased by means of a tension member 167 that the contact member 161 is out of engagement with the contact member 159. Associated with the metal discs 165 and 166 are field elements 168 and 169, respectively, which are effective to actuate the shaft 164 against the bias of the tension member 167 in a direction to cause engagement of the contact members 159 and 161, which engagement is effected upon a predetermined flow of power through the transmission system. The field element 168 comprises a voltage winding 171, that is connected between two supply-circuit conductors, such as 22 and 24, and a current winding 172, that is connected to be energized in response to the current flowing through one of these conductors, as 22. The field element 169 is provided with a voltage winding 173 that is connected between the supply conductors 23 and 24, and with a current winding 174 that is connected to be energized in accordance with the current flowing in the supply conductor 23.

If a transient condition occurs upon the power system, causing the relay 86 to close its contacts, when the power transmitted is below a predetermined value, the contact members 159 and 161 will be out of engagement, and the movable contact-member 161 will not materially alter its position, during the initial period of the transient, even though the fault should greatly change the power, because said contact member is carried by an induction-disk meter, which is inherently sluggish, in its action, on account of the dragging effect of the magnetic poles on the disk. Hence the contactor 32 will not be operated to reduce the power input to the generating unit.

This condition corresponds to a low value of $P_0$ on the diagrams indicated in Figs. 2, 4, 6 and 7. With a low value of $P_0$, the area to the left of the curve C of Fig. 6 and below the line $P_0$—O is less than the area above the line $P_0$—O and below the arch of the curve C, so that the transmission system has sufficient inherent stabilizing qualities to prevent the generator from falling out of synchronism with the transmission line. As the power required to be delivered by the generating unit increases with an increased demand on the generating station, the governor mechanism causes an increase in the opening of the gate 7, to maintain the desired speed of the generating unit, which corresponds to an increased value of $P_0$ on the diagram of Fig. 6. As shown in the diagram of Fig. 6, an increase in the value of $P_0$ beyond a certain point for a given curve C results in an unstable power-circuit condition. The watt relay 135 is, therefore, set to close its contacts 159 and 161 at some predetermined value of power output from the generator, which corresponds approximately to a value of $P_0$, or power input to the prime mover that may be determined by experience. If a fault occurs on the transmission system while sufficient power is being transmitted to cause the relay 135 to close its contact members 159 and 161, the contactor 32 will be operated, in the manner above described, to decrease the power input of the prime mover 1.

The effect of a single-phase fault, in a transmission system having high-resistance tower-grounds, is usually to momentarily increase the electrical output of the generator, as illustrated in curve B of Figs. 4, 6 and 7. In many transmission lines, ground wires and low-resistance towers are used as a means of lightning protection, and these produce such a change in the line constants that it is exceptional for an initial increase in power to result from a single-phase ground. The partial collapse of the positive-sequence line-voltage, as a result of a low-resistance ground, almost always results in a reduction in the power transmitted by the line. As pointed out in connection with curve C of Fig. 6, the circuit breakers operate to clear the fault, anyway, at a time when the electric power-output of the generator is below its input, so that the phase-swing which is to be restrained, if stability is to be maintained, is in any event a forward phase swing, in a direction tending to increase the phase-angle between the sending and receiving ends of the transmission line, and this forward phase-swing of the generator is caused by a reduction of the electrical output under the mechanical input, as a result of conditions produced by the fault.

Fig. 9 illustrates an embodiment of our invention, wherein the pivot point 11 of the lever 4 is fixed, as by being mounted on a suitable support 44. In this embodiment of our invention, we utilize an overswing-preventing initiating relay that is responsive to a predetermined sudden decrease in the real-power electrical output of the generator. The relay is provided with a field member 71 comprising a voltage coil 72 that may be connected across two of the power-circuit conductors, such as 22 and 24, and a current coil 73 that may be connected to two current transformers 84 and 85 that are responsive to the currents flowing in the same two conductors 22 and 24. The field member 71, with the connections just described, causes the disc 75 and the shaft 76 to be rotated, against the torsion of a spring 167, through an angle in accordance with the real power of the transmission line. This wattmeter regulator is shown in Fig. 4 of a patent to Brown, 1,234,864, July 31, 1917, assigned to the Westinghouse Electric and Manufacturing Company. A contact arm 77 is connected to the shaft 76 and carries a contact member 78 that is adapted to engage a contact member 79 carried by a metallic disc 81. The disc 81 is rotatably mounted upon the shaft 76 and is connected by means of a spring 82 to be driven from the arm 77. A permanent magnet 83 is provided which acts as a damping magnet to prevent a rapid change in the angular position of the metallic disc 81. So long as the power carried by the transmission line does not change suddenly in large amounts, the contact members 78 and 79 are disengaged. Upon a rapid acceleration of the shaft 76 corresponding to a rapid decrease in the power of the circuit, the arm 77 will move to a new position more quickly than the disc 81 can follow it, thus increasing the bias of the spring 82 and causing engagement of the contact members 78 and 79 at a predetermined torque between the arm 77 and the disc 81, thereby operating the electrical mechanism for introducing the corrective action into the system.

The engagement of the relay contact members 78 and 79 closes a circuit through the operating winding 45 of a contactor 46. When operated to its upper position, the contactor 46 connects resistors 48 across the generator conductors, thus dissipating the kinetic energy that would otherwise tend to accelerate the generator during such transient power-circuit conditions. It is desirable that the contactor 46 close at a time when the generator load is less than the prime-mover output, as previously explained, as, for example, at the angle $\theta_2$ of Fig. 7.

Fig. 10 illustrates an embodiment of our invention, wherein the governor and pilot valve control mechanism is similar to that illustrated in Fig. 9, and the ground relay 28 is actuated, upon abnormal power-circuit conditions, to cause the opening of a valve 51 which permits the escape of fluid from the penstock 8 through the pipe 52, thus decreasing the pressure head upon the prime mover.

The valve 51 is shown as being operatively connected to motor 53 by means of a rack and pinion 54. The motor 53 comprises an armature winding 55 and a field winding 56 that is illustrated as being energized from a source of energy 57. The armature winding 55 is connected by means of conductors 58 and 59, and contact members of the electromagnetic contactor 62, to a source of electric energy 61. The contactor 62 is provided with an operating winding 63 and a pair of contact members 64 and 65, for connecting the motor armature 55 to the source of energy 61 to operate in one direction of rotation when the contactor is in its lower position, and with a pair of contact members 66 and 67 for connecting the motor armature 55 to the source of electric energy 61 to operate in the other direction of rotation when the contactor is in its upper or energized position. Limit switches 68 and 69 are illustrated in the motor circuit to interrupt the operation of the motor at each end of the travel of the valve 51. The limit switches may be operated by any suitable well-known mechanism, not shown. The operating winding 63 of the contactor 62 is automatically connected to the source of energy 61, by means of a phase-sequence relay 86 which is similar to that described in connection with Fig. 8, except that it is connected to the line 22, 23, 24 in such phase-sequence as to respond to the negative-phase-sequence voltage-component.

Upon the occurrence of a fault condition upon the power circuit, the negative-phase-sequence component of the line-voltage will rise from substantially zero to at least a predeterminable value, and the relay winding 89, receiving a current proportional to the negative-sequence voltage, will operate, at a predetermined current value, to close a circuit through the contact members 87 and 88, and initiate a corrective action in the system, by energizing the operating winding 63 of the contactor 62.

Figure 11:
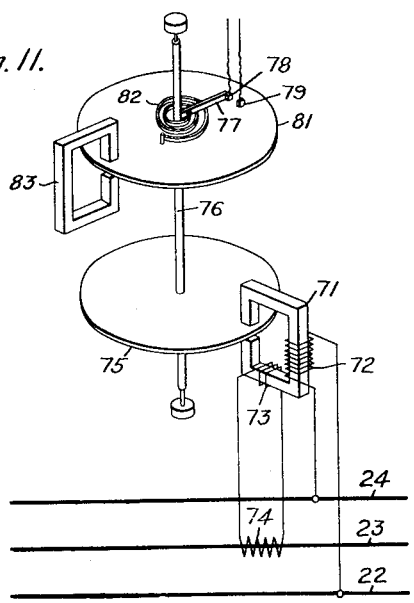
Fig. 11 is a diagrammatic view of a device that is responsive to reactive KVA of the power system for initiating the corrective action.

Fig. 11 illustrates a relay that may be substituted for the ground generator-overswing, corrective-initiating relay in any of the embodiments of the invention, and is similar to that shown in Fig. 9 except that it is connected to respond to abnormal reactive power conditions. The current coil is connected to a current transformer 74, that is responsive to the current flowing in the conductor 23 which is not connected to the voltage coil 72. So long as the reactive power of the transmission line is below a predetermined value, the contact members 78 and 79 are disengaged. Upon a rapid acceleration of the shaft 76 corresponding to the rapid increase in the reactive power of the circuit, the arm 77 will move to a new position more quickly than the disc 81, thus increasing the bias of the spring 82 and causing engagement of the contact members 78 and 79 at a predetermined torque between the arm 77 and the disc 81, thereby operating the electrical mechanism for introducing the corrective action into the system.

Figures 12, 13:
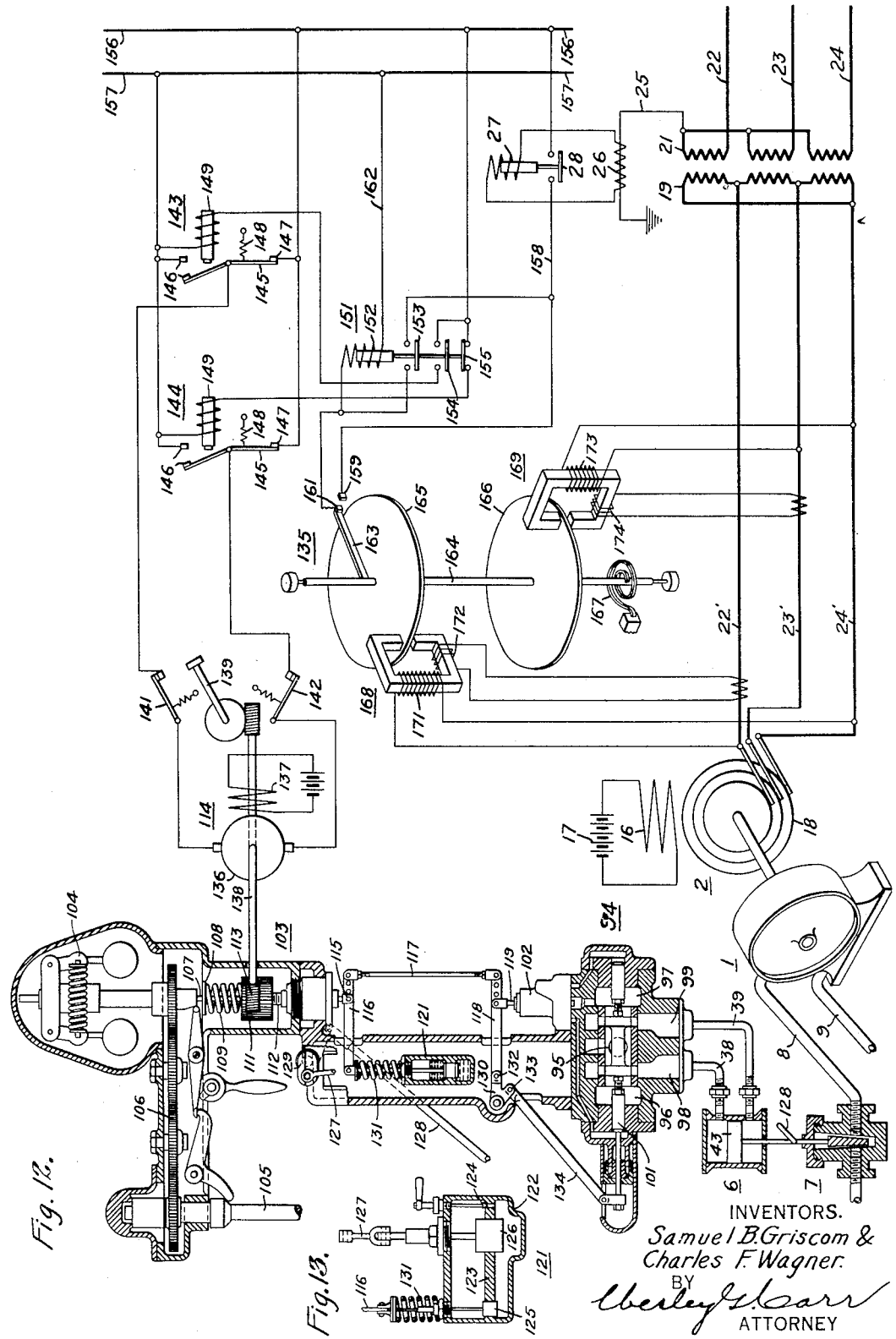
Fig. 12 is a diagrammatic view of circuits and apparatus illustrating another embodiment of our invention.
Fig. 13 is a sectional view of a dash pot illustrated as an element of the system shown in Fig. 12.

Fig. 12 illustrates a modification of our invention, wherein the generator-overswinging, corrective-initiating relay is effective to introduce a corrective action into the system only upon the flow of a predetermined amount of power through the system. The operating cylinder 6 for actuating the main gate 7 is controlled by the valve mechanism, indicated generally at 94, and provided with a fluid-inlet port 95 and outlet ports 96 and 97 through which fluid is fed, by means of the passages 98 and 99, to and from the ends of the cylinder 6, in accordance with the position of the valve member 101. The valve member 101 is controlled by a pilot valve 102 in accordance with the operation of a governor mechanism, indicated generally at 103. The details of operation of the pilot valve 102 and the valve mechanism 94 are well known and it is deemed unnecessary to further describe them.

The governor mechanism 103 comprises fly balls 104 that are actuated in accordance with the speed of the prime mover 1 by means of a shaft 105 and gearing mechanism 106. The governor mechanism operates a rod 107 upon which is mounted a collar 108 against which a coil spring 109 is biased. The lower end of the spring 109 is biased against a gear member 111 that is threadedly connected to the shaft 112 and is adapted to be operated to increase or decrease the pressure of the spring 109 to thereby vary the setting of the governor mechanism, this setting determining the valve opening corresponding to a particular speed of the governor mechanism. The gear wheel 111 is actuated by a gear member 113, operated by an electric motor 114.

The lower end of the governor rod 107 is pivotally connected, at 115, to a floating lever 116 to one end of which the rod 117 is connected for actuating a floating lever 118. The pilot valve 102 is actuated by means of a rod 119 connected to the floating lever 118. The left-hand end of the floating lever 116 is connected to a dash pot 121, the detail construction of which is more clearly shown in Fig. 13 of the drawings. The dash pot 121 comprises a casing 122, provided with a horizontal partition 123 and a by-pass valve 124 which may be set to regulate the rate of flow of fluid from one side to the other of the partition 123. A piston 125 is provided, connected to the end of the floating lever 116, and a second piston 126 is provided and is connected by means of the rod 127 to one portion of the crank member 129 and from which the rod 128 connects with the operating shaft of the valve 7. (For convenience in illustrating, the rod 128 is shown broken in Fig. 12 of the drawing.) A spring member 131 normally biases the dash pot 125 to a predetermined position. The left-hand end of the lever 118 is pivotally connected at the point 132 to a crank member 130 from which, at the pivot point 133, a rod 134 connects with the moving valve element 101, previously described.

The operation of the governor mechanism is as follows:

If the speed of the prime mover rises above or falls below that for which the governor is set, the flyballs 104 will move away from and toward each other to actuate the rods 107 and 117, thus operating the pilot valve 102 to control the valve element 101 and permit fluid to flow to and from the cylinder 6 through the chambers 96 and 97, and the passages 98 and 99, to operate the valve 7. When the valve 7 is operated in a closing direction, the rod 128 is actuated downwardly, thus rocking the crank member 129 in a direction to pull upwardly on the rod 127 and raise the piston 126. The suction of the piston 126 lowers the piston 125, thus actuating the floating lever 116 about the pivot point 115 in a direction to raise the rod 117 and the pilot valve rod 119, and introducing an anti-hunting action into the operation of the governor. Movement of the valve 101 causes the crank member 130 to be actuated by the rod 134, in a direction to so move the pivot point 132 as to further actuate the rod 119 in a direction to introduce a second anti-hunting action in the operation of the governor mechanism.

In Fig. 12, we have shown a generator-overswing, corrective-initiating relay 28 having a winding 27 energized from current transformer 26 that is responsive to the current-flow in the grounded neutral connection 25 of the transmission-line transformer 21. The relay 28 is actuated whenever a fault-current flows from a lineconductor to ground, returning through the neutral transformer connection 25.

The motor 114, for changing the setting of the governor mechanism, is actuated by the relay 28 to vary the tension of the spring 109, during the occurrence of transient conditions on the power circuit, providing that sufficient power is flowing through the power circuit to close the contacts of a watt relay 135, similar to that described in connection with Fig. 8, to thus introduce a stability factor into the transmission system. The motor 114 is provided with an armature winding 136 and a field winding 137. The armature winding of the motor actuates the gear element 113 by means of the shaft 138 which also actuates a control member 139 for opening the one or the other of two limit switches 141 and 142 to prevent the motor from being actuated beyond a desired position.

The motor 114 is controlled by a pair of reversing switches 143 and 144. Each of the reversing switches comprises a movable contact-making arm 145 for closing a circuit through a pair of cooperating contact members 146 or a pair of cooperating contact members 147. The arms 145 are normally biased to their illustrated positions by means of springs 148, thus completing a dynamic-braking circuit through the lower cooperating pairs of contact members 147 of the two switches. An electromagnet 149 is provided for actuating the arm 145 to its second circuit-closing position to cause engagement of the cooperating contact members 146.

The reversing switches 143 and 144 are controlled by an electromagnetic contactor 151 which is provided with an operating winding 152 and contact members 153, 154 and 155 which operate to connect the windings 149 of the reversing switches 143 and 144 across the supply conductors 156 and 157.

When a predetermined amount of power is being transmitted over the transmission line, and the ground relay 28 is actuated to its circuit-closing position, a circuit is completed from the supply conductor 156, through the relay 28, the conductor 158, contact members 159 and 161 of the watt relay 135, operating winding 152 and conductor 162, to the supply conductor 157, thus causing the contactor 151 to be actuated to its upper position and close circuits through the contact members 153 and 154. The contact member 153 closes a holding circuit through the operating winding 152 of the electromagnet that is independent of the watt relay 135 to maintain its circuit energized until the relay 28 again opens.

The contact member 154 closes a circuit from the supply conductor 156 through the operating winding of a reversing switch 143 to the supply conductor 157, thus operating the reversing switch 143 in a direction to close its cooperating contact members 146 and operate the motor 114 in a direction to so vary the tension of the adjusting spring 109 that the governor mechanism will cause the operation of the gate 7 in a closing direction.

When the primary or ground relay 28 opens, the electromagnetic contactor 151 is deenergized and drops to its lower position, interrupting the circuit through the operating winding of the reversing switch 143, and permitting it to be actuated by the spring 148 to its illustrated position. A circuit is likewise completed through the lower contact member 155 of the electromagnet, energizing the operating winding 149 of the reversing switch 144 and causing it to be actuated to close a circuit through its cooperating contact members 146, thus causing the motor 114 to be operated in the reverse direction and return the gear element 111 to its previous position corresponding to the desired tension on the spring 109 for normal operation of the governor mechanism. The position of the gear element 111 is determined by the adjustment of the control arm 139 for opening the limit switches 141 and 142, to interrupt the action of the motor 114.

If a fault occurs on the transmission system while sufficient power is being transmitted to cause the relay 135 to close its contact members 159 and 161, the motor 114 will be operated, in the manner above described, to decrease the power input to the prime mover 1.

Many modifications may be made in the circuits and apparatus illustrating embodiments of our invention and we do not wish to be limited otherwise than by the scope of the appended claims.

We claim as our invention:—

1. An alternating-current transmission system comprising synchronous electric machines and a transmission line connecting the same, said line having a fault-responsive sectionalizing means, characterized by stability-preserving means comprising a quick-acting load-changing device at at least one end of the line for artificially changing the load in such direction as to decrease the increasing-phase-angle swing between the two ends of the line after the occurrence of a fault on the line, quick-acting fault-responsive means operative faster than the fault-responsive sectionalizing means for getting said load-changing device into full, effective operation, and means for subsequently automatically removing said load-changing device from operation after at least the aforesaid phase-swing has been suitably restrained so as to assist materially in preserving stability.

2. An alternating-current transmission system comprising synchronous electric machines and a transmission line connecting the same, said line having a fault-responsive sectionalizing means, characterized by stability-preserving means comprising a quick-acting load-changing device at the sending end of the transmission line for artificially increasing the load, quick-acting fault-responsive means operative faster than the fault-responsive sectionalizing means for getting said load-changing device into full, effective operation, and means for subsequently automatically removing said load-changing device from operation after at least the initial increasing-phase-angle swing between the two ends of the line has been suitably restrained so as to assist materially in preserving stability.

3. As a means for increasing the stability and the power limits of an electrical system comprising synchronous machines connected through a three-phase transmission line comprising a three-phase power-line section, at each end, with a circuit-breaker means and a selectively operative, fault-responsive relaying means therefor, each circuit-breaker means and relaying means being operative to open-circuit its end of the faulty power-line section, quick-acting generator-loading means, responsive to a fault somewhere in the electrical system, and automatic means for subsequently removing said generator-loading means.

4. An alternating-current transmission system comprising synchronous electric machines and a transmission line connecting the same, said line having fault-responsive sectionalizing means, a resistance device so arranged that it may temporarily load a synchronous generator, fault-responsive means for placing said resistance device in operative loading relation to the transmission system near said generator, and means for subsequently automatically removing said resistance device from operative loading relation to the transmission system.

5. In a transmission system, a synchronous generator, a transmission line connected thereto, said line having a fault-responsive sectionalizing means, a prime-mover for supplying mechanical power to said generator, and electric fault-responsive means for temporarily altering the available generator-turning power delivered to said generator within a time which is small in comparison to the half-period of oscillation of the system, the direction of alteration being such as to reduce said oscillation.

6. In a transmission system, a synchronous generator, a prime-mover for supplying mechanical power to said generator, and electric fault-responsive means for temporarily loading said generator within a time which is small in comparison to the half-period of oscillation of the system.

7. In a transmission system, a synchronous generator, a prime-mover, and electric fault-responsive means for temporarily connecting a shunt resistance to said generator within a time which is small in comparison to the half-period of oscillation of the system.

8. In a transmission system, a synchronous generator, a transmission line connected thereto, said line having a fault-responsive sectionalizing means, a prime-mover for supplying mechanical power to said generator, and electric fault-responsive means for temporarily artificially controlling the relation between the generator input and the power delivered to the rest of the system by said generator within a time which is small in comparison to the half-period of oscillation of the system.

9. A synchronous electric system having generator-means and line-means, characterized by electric meter-means responsive to a predeterminedly large and sudden change in the product of a current-function and a voltage-function for quickly imposing a temporary auxiliary load on the generator means.

10. A synchronous electric system having generator-means and line-means, characterized by electric meter-means responsive to a predeterminedly large and sudden change in the product of a current-function and a voltage-function for quickly imposing a temporary resistance load on the generator-means.

11. A synchronous electric system having generator-means and line-means, characterized by electric meter-means responsive to a predeterminedly large and sudden change in the product of a current-function and a voltage-function for quickly imposing a temporary shunt-resistance load on the generator-means.

12. A synchronous electric system having generator-means and line-means, characterized by electric meter-means responsive to a predeterminedly large and sudden change in the real power for quickly imposing a temporary auxiliary load on the generator means.

13. A synchronous electric system having generator-means and line-means, characterized by electric meter-means responsive to a predeterminedly large and sudden change in the real power for quickly imposing a temporary resistance load on the generator-means.

14. A synchronous electric system having generator-means and line-means, characterized by electric meter-means responsive to a predeterminedly large and sudden change in the real power for quickly imposing a temporary shunt-resistance load on the generator-means.

15. A synchronous electric system having generator-means including a prime mover and line-means, characterized by electro-responsive means responsive substantially to a symmetrical phase-sequence line-circuit function for quickly decreasing the effective output of said prime mover.

16. A synchronous electric system having generator-means including a prime mover and line-means, characterized by electro-responsive means responsive substantially to a positive phase-sequence line-circuit function for quickly decreasing the effective output of said prime mover.

17. A synchronous electric system having generator-means including a prime mover and line-means, characterized by electro-responsive means responsive substantially to a phase-sequence line-circuit function for quickly imposing a temporary artificial control on the relation between the generator input and the power delivered to the rest of the system by said generator-means.

18. In a transmission system, a synchronous generator, a transmission line connected thereto, said line having a fault-responsive sectionalizing means, a prime-mover for supplying mechanical power to said generator, and electric fault-responsive meter-means responsive to a predeterminedly large and sudden change in a function of the line-current and the line voltage for temporarily artificially controlling the relation between the generator input and the power delivered to the rest of the system by said generator within a time which is small in comparison to the half-period of oscillation of the system.

19. In a transmission system, a synchronous generator, a transmission line connected thereto, said line having a fault-responsive sectionalizing means, a prime-mover for supplying mechanical power to said generator, and electric meter-means responsive to a predeterminedly large and sudden change in a function of the line-current and the line voltage for quickly introducing temporary corrective measures for assisting in maintaining stability during the transient following a disturbance.

20. The invention as specified in claim 5, characterized by the fact that said fault-responsive means is responsive substantially to a symmetrical phase-sequence component of the line-voltage.

21. The invention as specified in claim 5, characterized by the fact that said fault-responsive means is responsive substantially to the positive-phase-sequence component of the line-voltage.

22. The invention as specified in claim 5, characterized by the fact that said fault-responsive means is responsive substantially to the negative-phase-sequence component of the line-voltage.

23. The invention as specified in claim 8, characterized by the fact that said fault-responsive means is responsive substantially to a symmetrical phase-sequence component of the line-voltage.

24. The invention as specified in claim 8, characterized by the fact that said fault-responsive means is responsive substantially to the positive-phase-sequence component of the line-voltage.

25. The invention as specified in claim 8, characterized by the fact that said fault-responsive means is responsive substantially to the negative-phase-sequence component of the line voltage.

26. In a transmission system, a synchronous generator, a fluid-power prime-mover therefor, main control-means for the fluid-input of said prime-mover, an auxiliary fluid-controlling valve for altering the fluid-input of said prime-mover, and electric fault-responsive means for altering the setting of said auxiliary fluid-controlling valve so as to temporarily reduce the fluid-input of said prime-mover within a time which is small in comparison to the half-period of oscillation of the system.

27. In a transmission system, a synchronous generator, a fluid-power prime-mover therefor, main control-means for the fluid-input of said prime-mover, an auxiliary fluid-controlling valve for by-passing the fluid-input of said prime-mover, and electric fault-responsive means for opening said auxiliary fluid-controlling valve.

28. In a transmission system, a synchronous generator, a fluid-power prime-mover therefor, a transmission line connected to said generator, said line having a fault-responsive sectionalizing means, a fluid-controlling valve for controlling the fluid-input of said prime-mover, motive power means for operating said valve, a speed-governor for said prime-mover, connecting means between said speed-governor and said motive-power means, and electric fault-responsive means selectively responsive to a fault condition as distinguished from a non-fault condition for temporarily changing the effective operational setting of said speed-governor and for subsequently restoring its normal operational setting after a brief time-interval.

29. In a transmission system, a synchronous generator, a fluid-power prime-mover therefor, a transmission line connected to said generator, said line having a fault-responsive sectionalizing means, a fluid-controlling valve for controlling the fluid-input of said prime-mover, motive-power means for operating said valve, main control-means for the fluid-input of said prime-mover, means for operatively connecting said main control-means and said motive-power means, and electric fault-responsive means selectively responsive to a fault condition as distinguished from a non-fault condition for temporarily changing the effective operational setting of said main control-means and for subsequently restoring its normal operational setting after a brief time-interval.

30. A synchronous power-transmission system having a fault-responsive element, a power-responsive element for rendering the fault-responsive element inoperative except when the power exceeds a predetermined amount, and means jointly responsive thereto for introducing temporary corrective measures for assisting in maintaining stability during the transient following a disturbance.

31. An electric power-transmission system having a quick-acting fault-responsive element, a sluggish power-responsive element for rendering the fault-responsive element inoperative except when the power exceeds a predetermined amount, and means jointly responsive thereto for introducing temporary corrective measures for assisting in maintaining stability during the transient following a disturbance.

32. An electrical power-transmission-line system comprising a plurality of synchronous generators, a prime-mover for each of said generators, a power-operated means for quickly decreasing or increasing the effective output of the prime-mover of at least one of said generators, according to either one of two modes of operation of said power-operated means, line-sectionalizing means, and line-fault-responsive means for initiating the operation of said line-sectionalizing means for clearing a fault on the line and for energizing said power-operated means in one mode of operation as long as the fault lasts and for energizing said power-operated means in the other mode of operation when the fault no longer remains on the line.

33. An electrical power system comprising a plurality of synchronous generators, a prime-mover for each of said generators, a power-operated means for quickly artificially changing the ratio between the effective mechanical output of at least one prime-mover and the electric power delivered by its associated generator to the rest of the system, according to either one of two modes of operation of said power-operated means, and fault-responsive means for energizing said power-operated means in one mode of operation as long as the fault lasts and for energizing said power-operated means in the other mode of operation when the fault no longer remains on the system.

34. An electrical power-transmission-line system comprising a plurality of synchronous generators, a prime-mover for each of said generators, a power-operated means for quickly artificially changing the ratio between the effective mechanical output of at least one prime-mover and the electric power delivered by its associated generator to the rest of the system, according to either one of two modes of operation of said power-operated means, line-sectionalizing means, and line-fault-responsive means for initiating the operation of said line-sectionalizing means for clearing a fault on the line and for energizing said power-operated means in one mode of operation as long as the fault lasts and for energizing said power-operated means in the other mode of operation when the fault no longer remains on the line.

35. In a system of distribution, a distribution circuit, a synchronous alternating current generating source connected thereto for operation in synchronism therewith, an auxiliary power consuming device normally disconnected from said generating source, and means operative in accordance with faults on said distribution circuit for connecting said auxiliary power consuming device to said generating source between the point of said fault and the terminals of said generating source to maintain conditions for synchronous operation between said source and said distribution circuit.

36. In a system of distribution, a distribution circuit, a synchronous alternating current generating source connected thereto for operation in synchronism therewith, an auxiliary power consuming device normally disconnected from said generating source, and means operative in accordance with faults on said distribution circuit for connecting said auxiliary power consuming device to the terminals of said generating source to maintain conditions for synchronous operation between said source and said distribution circuit.

37. In a system of distribution, an electrical power-translating device comprising a synchronous dynamo-electric machine, a transmission line connected to said dynamo-electric machine, and means operative in accordance with a function of symmetrical phase sequence components of an electrical characteristic of said transmission line for temporarily artificially controlling the relation between the power interchanged between the machine and the rest of the system and the power translated by the machine when said transmission line is subjected to short-circuit conditions.

38. In a system of distribution, an electrical power-translating device comprising a synchronous dynamo-electric machine, a transmission line connected to said dynamo-electric machine, and means responsive to a symmetrical phase sequence component of an electrical characteristic of said transmission line for temporarily artificially controlling the relation between the power interchanged between the machine and the rest of the system and the power translated by the machine when said transmission line is subjected to short-circuit conditions.

39. In a system of distribution, an alternating current generator, a transmission line connected to said generator, a plurality of resistor units normally disconnected from said generator, and fault responsive means operative when the load on said generator is suddenly changed for connecting said resistor units across the terminals of said generator.

40. In a system of distribution, a distribution circuit, an alternating current generating source connected thereto, and means response to a function of a symmetrical phase sequence component of an electrical condition of said transmission line for temporarily artificially controlling the relation between the generator input and the power delivered to the rest of the system by said generating source during said fault and removing said artificial control when normal operating conditions are restored.

41. In a system of distribution, a distribution circuit, a synchronous alternating current generating source connected thereto, an auxiliary power consuming device normally disconnected from said generating source, means responsive to faults which decrease the load on said generating source for connecting said auxiliary power consuming device to said generating source when said distribution circuit is subjected to a fault, and means for disconnecting said auxiliary power consuming device from said generating source when normal operating conditions are restored in said distribution circuit.

42. In a system of distribution, an alternating current generator, a distribution circuit connected thereto, an auxiliary non-reactive load device normally disconnected from said generator, means responsive to a sudden drop in load over said distribution circuit for connecting said auxiliary load device to said generator, and means operative after a predetermined time interval for disconnecting said auxiliary load device from said generator.

SAMUEL B. GRISCOM.
CHARLES F. WAGNER.